United States Patent [19]

Bujold

[11] Patent Number: 4,546,660
[45] Date of Patent: Oct. 15, 1985

[54] EARTHQUAKE-RESPONSIVE VALVE MOTOR

[76] Inventor: Victor N. Bujold, 3415 Claremore, Long Beach, Calif. 90808

[21] Appl. No.: 553,136

[22] Filed: Nov. 18, 1983

[51] Int. Cl.$^4$ ............................................. F16K 17/36
[52] U.S. Cl. ........................................... 74/2; 137/45; 185/29; 185/37; 251/74; 251/313; 267/156
[58] Field of Search ................. 137/38, 39, 45; 74/2; 251/313, 66, 74; 267/154, 155, 156; 185/29, 37

[56] References Cited

U.S. PATENT DOCUMENTS

| 2,899,193 | 8/1959 | Foster | 267/156 |
| 3,491,602 | 1/1970 | New | 267/156 X |
| 3,791,396 | 2/1974 | Nelson | 137/38 |
| 4,161,183 | 7/1979 | Berry | 137/39 |
| 4,429,704 | 2/1984 | Jones | 251/66 X |

FOREIGN PATENT DOCUMENTS

| 36634 | 3/1980 | Japan | 137/45 |
| 72968 | 6/1980 | Japan | 137/38 |
| 155973 | 12/1980 | Japan | 137/38 |
| 42773 | 3/1981 | Japan | 137/38 |

Primary Examiner—Robert G. Nilson
Attorney, Agent, or Firm—Gordon L. Peterson

[57] ABSTRACT

An automatic valve motor for shutting off utilities, such as gas, in the event of an earthquake. The valve motor is self-contained and can be mounted by unskilled persons on a conventional residential gas installation adjacent the main valve without modifying the valve or interfering with the operation of the gas line. An omnidirectionally movable pendulum acting on a pivotal latch is used to release for rotation a wheel whose hub has a key slot which engages the actuator bar of the gas valve. The wheel is driven by a linear spring arrangement which exerts a generally tangential turning force on the wheel for maximum leverage throughout an arc of rotation of about 90°.

6 Claims, 5 Drawing Figures

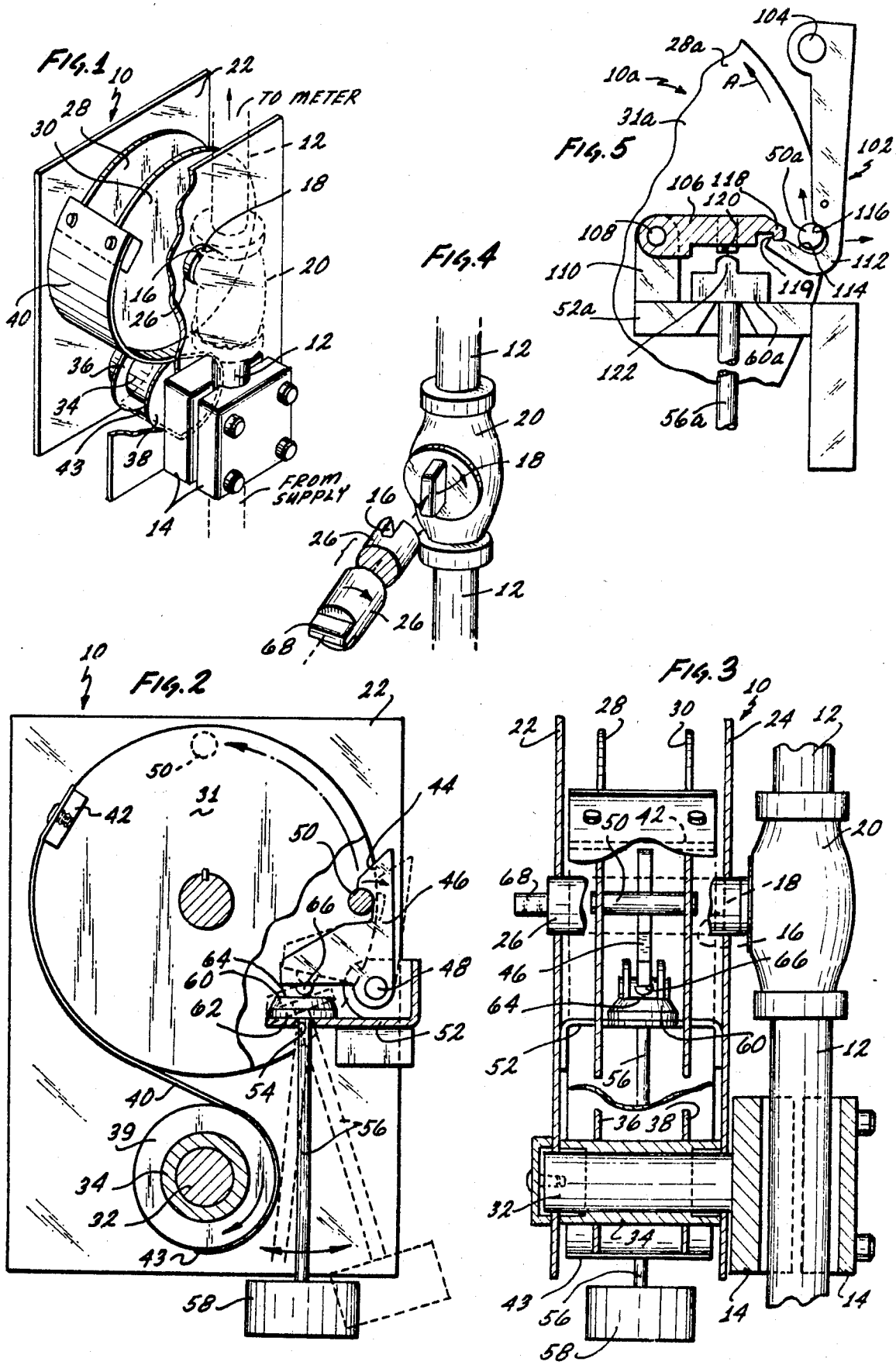

EARTHQUAKE-RESPONSIVE VALVE MOTOR

This invention relates to a safety device for automatically closing the main valve of a residential utility, such as gas, in the event of an earthquake.

BACKGROUND OF THE INVENTION

One of the major hazards following a significant earthquake is the danger of explosion and fire as a result of gas escaping from broken pipes. Many safety devices have been proposed to automatically shut off gas flow upon occurrence of an earthquake. Typical examples of such proposals are U.S. Pat. No. 3,890,993 to MacNeilage, U.S. Pat. No. 2,158,753 to Hansen, and U.S. Pat. No. 4,353,383 to Kiesel. All of these prior art devices, however, are commercially impractical because they require a specially constructed gas valve which would have to be installed in the gas line by a skilled plumber. Consequently, relatively few home owners use this type of safety device.

SUMMARY OF THE INVENTION

The invention solves the aforementioned problem by providing a simple, relatively inexpensive device which can be clamped to the gas pipe by unskilled persons, and engaged with the manual actuator bar of the traditional main gas valve to automatically turn the actuator bar to the "off" position in the event of an earthquake.

The device of this invention accomplishes this result by providing a support adapted to be clamped to the conventional gas pipe adjacent the main valve. The support carries a wheel whose hub is provided with a key slot of a type and size suitable for engaging the actuator bar of the main valve. The wheel and hub are biased toward rotation in the shut-off direction by a strong linear spring curved around the perimeter of the wheel, but are prevented from such movement by a pivotal latch. A pendulum is suspended between the support and the latch in such a way that a motion of the pendulum in any direction (vertical, horizontal, or any combination thereof) will trip the latch and release the wheel and hub to turn one quarter turn in the shut-off direction.

It is therefore the object of the invention to provide a simple earthquake-responsive utility shut-off device which can be externally and removably mounted on a conventional utility installation by unskilled persons without any modification of, or interference with, the utility installation.

It is another object of the invention to provide an earthquake-responsive utility shut-off device which operates as a spring-driven motor adapted to turn a valve-engaging key.

It is a further object of the invention to provide a device of the type described in which the motive power is a linear spring engaging the perimeters of a pair of oppositely turning wheels.

BRIEF DESCRIPTION OF THE DRAWINGS

FIG. 1 is a fragmentary perspective view, partly cut away, illustrating the installation of the device of this invention on a residential gas line.

FIG. 2 is a side elevation, partly in section, of the device of this invention.

FIG. 3 is an end view, partly in section, of the device of FIG. 2.

FIG. 4 is a fragmentary exploded perspective view illustrating the engagement of the actuator bar of the main gas valve by the key slot on the hub of the device of this invention.

FIG. 5 is a fragmentary side elevational view of a second embodiment of the invention.

DESCRIPTION OF THE PREFERRED EMBODIMENT

As best shown in FIGS. 1, 3 and 4, the valve motor 10 of this invention is mounted on a gas pipe 12 by a conventional clamp 14 in such a position that the key slot 16 engages the actuator bar 18 of a conventional shut-off valve 20 mounted in the pipe 12.

The valve motor 10 consists of a pair of parallel support plates 22, 24 in which a wheel hub 26 is journalled. The hub 26 is rigidly attached to a pair of rotor sections or wheel plates 28, 30 which together form the main rotor or wheel 31 (FIG. 2) of the motor 10. Near their lower ends, the support plates 22, 24 are held in position by the shaft 32 of the clamp 14, to which the support plates 22, 24 are fixedly attached. A bushing 34 is journalled for rotation on the shaft 32 between support plates 22, 24 and the bushing 34 carries a pair of disks 36, 38 rigidly attached to it. The disks 36, 38 form the takeup wheel 39 (FIG. 2) of this invention whose function will be described hereafter.

One end of a strong linear spring 40 is attached to the perimeter of the main wheel 31 by an attachment bracket 42. The spring 40 extends along the circumference of wheel plates 28, 30 in a counterclockwise direction for approximately 90°, and then lies around the circumference of disks 36, 38 in a clockwise direction for approximately 180°. The lower end 43 of spring 40 rests freely against the takeup wheel 39 and is not attached to it.

The linear spring 40 is performed to a curvature such that it has a strong tendency to wind itself around takeup wheel 39. As a result of this tendency, the spring 40 attempts to turn the main wheel 31 in a counterclockwise direction in FIG. 2 while winding itself around the takeup wheel 39 in a clockwise direction in FIG. 2. The linear spring arrangement used in the preferred embodiment of the invention is chosen because, due to the nature of that type of spring and the leverage provided by the radius of wheel 31, it is capable of exerting a very large turning force on the hub 26. A large turning force is necessary in the device of this invention because gas valves are typically very hard to turn.

The main wheel 31 is held against counterclockwise rotation by the slightly hook-shaped dog 44 of a latch 46 pivoted about an axle 48. The dog 44 engages a locking bar 50 extending between wheel plates 28 and 30, and its hook shape biases the latch 46 into locked position.

A support bracket 52 is fixedly mounted between the support plates 22, 24. The bracket 52 has an opening 54 through which a rod 56 extends with a rather loose fit. At its bottom, the rod 56 supports a preferably cylindrical weight 58 which, in conjunction with the rod 56, acts essentially like a pendulum. The upper end of rod 56 is secured to a drive member or plate 60 whose lower surface normally lies flat against the upper surface of bracket 52.

If vertical earthquake motion occurs, the weight of cylinder 58 pushes rod 56 and plate 60 vertically upward. If horizontal earthquake movement occurs, the swing of the pendulum formed by rod 56 and weight 58 causes plate 60 to pivot about a point on its periphery, for example point 62. In either event, the center 64 of the top surface of plate 60 moves upwardly and engages the nose 66 of latch 46. The resulting upward movement of nose 66 causes latch 46 to pivot about axle 48 and to move dog 44 sufficiently to the right in FIG. 2 to cause it to slide off the cam or locking bar 50.

With the locking bar 50 free, the main wheel 31 the hub 26 can turn in a counterclockwise direction under the bias of spring 40, and the key slot 16 in the hub 26 turns the actuator bar 18 in a direction to close the valve 20.

Opposite its key-slotted end, the hub 26 is provided with a flat extension 68, so that the mechanism can be reset with a wrench following operation of the mechanism. The extension 68 allows the wrench to be used to turn the main wheel 31 in a clockwise direction against the bias of spring 40 until the dog 44 once again slips over the locking bar 50 and retains it.

FIG. 5 shows a valve motor 10a which is identical to the valve motor 10 in all respects not shown or described herein. Portions of the valve motor 10a corresponding to portions of the valve motor 10 are designated by corresponding reference numerals followed by the letter "a."

The valve motor 10a is identical to the valve motor 10, except for the manner in which the main wheel 31a is retained. The valve motor 10a is more sensitive to earthquake shocks than is the valve motor 10.

The valve motor 10a includes latch means which includes a first latch 102 pivotally mounted by a pin 104 on the support plates 22 and 24 (not shown). The latch means also includes a second latch 106 pivotally mounted by a pin 108 on legs 110 affixed to the bracket 52a. The latch means also includes the cam or locking bar 50a in the form of a pin coupled to the main wheel 31 and which extends between the wheel plates 28a and 30a (not shown).

More specifically, the latch 102 has a hook 112 at its free end defining a recess 114 for receiving the locking bar 50a. The recess 114 is partially defined by a cam surface 116 which engages the locking bar 50a in the position shown in FIG. 5. The hook 112 terminates in a flanged end 119.

The latch 106 has a flanged end 118 remote from the pin 108 which lockingly engages the flanged end 119 of the latch 102. An adjustable screw 120 is threaded into the latch 106 intermediate its ends and directly above a projection 122 of the drive member or plate 60a of the pendulum.

In the position shown in FIG. 5, the main wheel 31 is biased in the direction of the arrow A, and it is locked against rotation in this direction by the engagement of the locking bar 50a on the cam surface 116 of the latch 102. Thus, the locking bar 50a forms a locking surface for engaging the cam surface 116. The latch 102 is held in this locking position by the latch 106 and, specifically, by the locking engagement of the flanged ends 118 and 119. The locking bar 50a acts against the inclined cam surface 116 and tends to rotate the latch 102 counterclockwise about the pin 104 as shown in FIG. 5. This counterclockwise couple on the latch 102 causes the flanged ends 119 and 118 to be in tight frictional engagement, and this frictional engagement, as well as the weight of the latch 106, tends to hold the latch 106 in the position shown in FIG. 5.

If an earthquake should occur, the plate 60a rocks about its periphery as described above in connection with the embodiment of FIGS. 1-4. This elevates the projection 122 into engagement with the screw 120 to pivot the latch 106 counterclockwise as viewed in FIG. 5. This releases the latch 102, and the locking bar 50a acts against the cam surface 116 to cam the latch 102 counterclockwise about the pin 104 to a releasing position in which the main wheel 31 is freed for rotation under the influence of the spring 40 (not shown in FIG. 5). The double latch configuration of FIG. 5 is more sensitive because it is only necessary to pivot the latch 106 slightly to release the latch 102 and the main wheel 31a. Also the sensitivity can be changed by screwing the screw 120 farther into or out of the latch 106.

It will be seen that the mechanism described herein provides a simple earthquake-actuated safety device which can be quickly attached to, or removed from, a conventional utility installation even by an unskilled person, and which requires no interference with the utility installation itself.

I claim:

1. A mechanism for translating earthquake motion into rotary motion comprising:

a support;

a rotor;

means for mounting the rotor on the support for rotational movement about an axis;

biasing means for biasing the rotor for rotational movement in one direction about said axis;

releasable locking means for locking the rotor against rotational movement in said one direction about said axis;

said releasable locking means including first and second latches pivotally mounted on said support and a cam carried by the rotor, said first latch being engageable with the cam to lock the rotor against rotation about said axis in said one direction, said cam being cooperable with said first latch to rotate the first latch in a releasing direction to release the rotor for rotation about said axis in said one direction, and said second latch being engageable with the first latch to restrain the first latch against rotation in said releasing direction;

release means responsive to earthquake forces for pivoting said second latch in a direction to release said first latch whereby the rotor is released for rotation about said axis in said one direction;

said release means including a pendulum suspended from said support and swingable in response to said earthquake forces and a drive member drivingly coupling the pendulum to said second latch; and said drive member including a drive plate below the second latch and engageable therewith to pivot the second latch.

2. A mechanism for translating earthquake motion into rotary motion comprising:

a support;

a rotor;

means for mounting the rotor on the support for rotational movement about an axis;

biasing means for biasing the rotor for rotational movement in one direction about said axis;

releasable locking means for locking the rotor against rotational movement in said one direction about said axis;

said releasable locking means including first and second latches pivotally mounted on said support and a cam carried by the rotor, said first latch being engageable with the cam to lock the rotor against rotation about said axis in said one direction, said cam being cooperable with said first latch to rotate the first latch in a releasing direction to release the rotor for rotation about said axis in said one direction, and said second latch being engageable with the first latch to restrain the first latch against rotation in said releasing direction;

release means responsive to earthquake forces for pivoting said second latch in a direction to release said first latch whereby the rotor is released for rotation about said axis in said one direction;

said release means including a pendulum suspended from said support and swingable in response to said earthquake forces and a drive member drivingly coupling the pendulum to said second latch; and said biasing means including a linear spring and a wheel, and one end of the linear spring being attached to said rotor and the other end being attached to said wheel.

3. A mechanism for translating earthquake motion into rotary motion comprising:

a support;

a rotor;

means for mounting the rotor on the support for rotational movement about an axis;

biasing means for biasing the rotor for rotational movement in one direction about said axis;

releasable locking means for locking the rotor against rotational movement in said one direction about said axis;

said releasable locking means including first and second latches pivotally mounted on said support and a cam carried by the rotor, said first latch being engageable with the can to lock the rotor against rotation about said axis in said one direction, said cam being cooperable with said first latch to rotate the first latch in a releasing direction to release the rotor for rotation about said axis in said one direction, and said second latch being engageable with the first latch to restrain the first latch against rotation in said releasing direction;

release means responsive to earthquake forces for pivoting said second latch in a direction to release said first latch whereby the rotor is released for rotation about said axis in said one direction;

said release means including a pendulum suspending from said support and swingable in response to said earthquake forces and a drive member drivingly coupling the pendulum to said second latch; and said rotor including first and second spaced rotor sections, and said cam and at least a portion of one of said latches being between said rotor sections.

4. A mechanism as defined in claim 3 wherein at least portions of both of said latches are between said rotor sections.

5. A mechanism for translating earthquake motion into rotary motion comprising:

a support;

a rotor;

means for mounting the rotor on the support for rotational movement about an axis;

biasing means for biasing the rotor for rotational movement in one direction about said axis;

releasable locking means for locking the rotor against rotational movement in said one direction about said axis;

said releasable locking means including first and second latches pivotally mounted on said support and a cam carried by the rotor, said first latch being engageable with the cam to lock the rotor against rotation about said axis in said one direction, said cam being cooperable with said first latch to rotate the first latch in a releasing direction to release the rotor for rotation about said axis in said one direction, and said second latch being engageable with the first latch to restrain the first latch against rotation in said releasing direction;

release means responsive to earthquake forces for pivoting said second latch in a direction to release said first latch whereby the rotor is released for rotation about said axis in said one direction;

said release means including a pendulum suspended from said support and swingable in response to said earthquake forces and a drive member drivingly coupling the pendulum to said second latch; and said drive member including a drive plate below the second latch and engageable therewith to pivot the second latch, said biasing means including a linear spring and a wheel, and one end of the linear spring being attached to said rotor and the other end being attached to said wheel.

6. A mechanism as defined in claim 5 wherein said rotor includes first and second spaced rotor sections, and said cam and at least a portion of one of said latches are between said rotor sections.

* * * * *